(12) United States Patent
Nagarajan et al.

(10) Patent No.: US 11,496,329 B2
(45) Date of Patent: Nov. 8, 2022

(54) EVPN MULTICAST INGRESS FORWARDER ELECTION USING SOURCE-ACTIVE ROUTE

(71) Applicant: Juniper Networks, Inc., Sunnyvale, CA (US)

(72) Inventors: Vikram Nagarajan, Bangalore (IN); Robert W. Kebler, Newburyport, MA (US); Dinesh Sivaraj, Bangalore (IN); Vinod Kumar N, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/825,732

(22) Filed: Mar. 20, 2020

(65) Prior Publication Data

US 2021/0297273 A1    Sep. 23, 2021

(51) Int. Cl.
*H04L 12/18* (2006.01)
*H04L 12/46* (2006.01)
(Continued)

(52) U.S. Cl.
CPC .......... *H04L 12/18* (2013.01); *H04L 12/4641* (2013.01); *H04L 45/50* (2013.01);
(Continued)

(58) Field of Classification Search
CPC ... H04L 12/18; H04L 12/4641; H04L 45/507; H04L 45/22; H04L 45/50; H04L 49/201;
(Continued)

(56) References Cited

U.S. PATENT DOCUMENTS

| 9,628,409 B1 | 4/2017 | Yuvaraj et al. |
| 10,382,217 B1 | 8/2019 | Kebler et al. |

(Continued)

FOREIGN PATENT DOCUMENTS

| CN | 107276784 A | 10/2017 |
| WO | 2018193285 A1 | 10/2018 |

OTHER PUBLICATIONS

Extended Search Report from counterpart European Application No. 20179739.6, dated Nov. 6, 2020, 7 pp.
(Continued)

*Primary Examiner* — Glenton B Burgess
*Assistant Examiner* — Rachel J Hackenberg
(74) *Attorney, Agent, or Firm* — Shumaker & Sieffert, P.A.

(57) ABSTRACT

The techniques describe example network systems providing core-facing designated forwarder (DF) election to forward multicast traffic into an EVPN of a core network. For example, a first PE device of a plurality of PE devices participating in an EVPN comprises one or more processors operably coupled to a memory, wherein the one or more processors are configured to: determine that a first multicast traffic flow has started for the first PE device; in response, send a source-active (SA) route to indicate the first multicast traffic flow has started for the first PE device; receive, from a second PE device, a second SA route that indicates that a second multicast traffic flow has started for the second PE device; and perform an election of a core-facing DF from among the first PE device and second PE device, wherein the core-facing DF is configured to forward the multicast traffic into the EVPN.

17 Claims, 4 Drawing Sheets

(51) Int. Cl.
*H04L 45/50* (2022.01)
*H04L 9/40* (2022.01)
*H04L 49/201* (2022.01)
*H04L 47/10* (2022.01)
*H04L 49/10* (2022.01)
*H04L 47/00* (2022.01)

(52) U.S. Cl.
CPC .............. *H04L 47/00* (2013.01); *H04L 47/10* (2013.01); *H04L 49/10* (2013.01); *H04L 49/201* (2013.01); *H04L 63/0272* (2013.01)

(58) Field of Classification Search
CPC ......... H04L 49/10; H04L 47/10; H04L 47/00; H04L 63/0272
See application file for complete search history.

(56) References Cited

U.S. PATENT DOCUMENTS

| | | | |
|---|---|---|---|
| 10,666,459 B1* | 5/2020 | Sajassi | H04L 12/4641 |
| 10,666,500 B2 | 5/2020 | Singh et al. | |
| 2013/0033978 A1* | 2/2013 | Eckert | H04L 45/28 370/216 |
| 2017/0288948 A1 | 10/2017 | Singh et al. | |
| 2017/0289217 A1* | 10/2017 | Kebler | H04L 47/825 |
| 2018/0034665 A1* | 2/2018 | Nguyen | H04L 12/4641 |
| 2018/0167315 A1* | 6/2018 | Kanjariya | H04L 45/02 |
| 2018/0287946 A1* | 10/2018 | Nagarajan | G06F 9/542 |
| 2019/0166407 A1 | 5/2019 | Sajassi et al. | |
| 2019/0229937 A1 | 7/2019 | Nagarajan et al. | |
| 2020/0021523 A1* | 1/2020 | Wang | H04L 12/4641 |
| 2020/0153728 A1* | 5/2020 | Xie | H04L 45/50 |
| 2020/0177402 A1* | 6/2020 | Mishra | H04L 12/4641 |

OTHER PUBLICATIONS

Sajassi et al. "IGMP and MLD Proxy for EVPN" draft-ietf-bess-evpn-igmp-mld-proxy-04, BESS Working Group, Internet-Draft, Sep. 30, 2019, 32 pp.

Adams et al. "Protocol Independent Multicast—Dense Mode (PIM-DM): Protocol Specification (Revised)" Network Working Group, RFC 3973, Jan. 2005, 61 pp.

Fenner et al., "Protocol Independent Multicast—Sparse Mode (PIM-SIM): Protocol Specification (Revised)," Network Working Group, RFC 4601, Aug. 2006, 150 pp.

Holbrook et al., "Source-Specific Multicast for IP," Network Working Group, RFC 4607, The Internet Society, Aug. 2006, 19 pp.

Handley et al., "Bidirectional Protocol Independent Multicast (BIDIR-PIM)," Network Working Group, RFC 5015, Oct. 2007, 43 pp.

Mohanty et al. "A new Designated Forwarder Election for the EVPN" draft-ietf-bess-evpn-df-election-03, BESS Working Group, Internet-Draft, Oct. 10, 2017, 15 pp.

Sajassi et al., "BGP MPLS-Based Ethernet VPN," RFC 7432, Internet Engineering Task Force (IETF), Feb. 2015, 56 pp.

Response to Extended Search Report dated Nov. 6, 2020, from counterpart European Application No. 20179739.6 filed Mar. 21, 2022, 26 pp.

First Office Action and Search Report, and translation thereof, from counterpart Chinese Application No. 202010528554.4 dated Aug. 3, 2022, 22 pp.

* cited by examiner

EVPN MULTICAST INGRESS FORWARDER ELECTION USING SOURCE-ACTIVE ROUTE

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

A network may support multicasting. Multicast traffic may include Internet Protocol Television (IPTV), desktop conferences, corporate broadcasts, music and video web casts, and other forms of multimedia content. The network may utilize protocol independent multicast (PIM) as a multicast routing protocol to control delivery of multicast traffic from multicast sources to multicast receivers for particular multicast groups.

In some examples, the network that distributes multicast packets may include an Ethernet Virtual Private Network (EVPN), which may be used to extend two or more layer two (L2) customer networks through an intermediate layer three (L3) network (usually referred to as a provider network or core network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

A multicast source may send multicast traffic to one or more PE devices of the EVPN to reach one or more multicast receivers that are external to the network (or data center) of the multicast source. In some examples, the multicast source sends multicast traffic to ingress PE devices that are separately connected to respective CE devices to provide resiliency for the multicast source to send multicast traffic over the intermediate network should one of the PE devices fail.

SUMMARY

In general, this disclosure describes techniques of a network system providing core-facing designated forwarder election of an ingress provider edge (PE) device to forward multicast traffic from a customer network into an EVPN of a core network. For example, in an EVPN, a plurality of PE devices (e.g., routers or switches) provide a multicast source with connectivity to a multicast receiver that is external to the core network (or data center) of the multicast source. In some examples, PE devices interconnected by the core network are often separately connected to respective customer edge (CE) devices that are each connected to a rendezvous point (RP) device of a customer network, where the RP device serves as an information exchange point in which multicast traffic from the multicast source and join messages from network devices of interested multicast receivers "rendezvous" at the RP device. According to the disclosed techniques, each of the ingress PE devices, in response to determining that a multicast traffic flow has started, sends a source-active route ("SA route") to other PE devices of the EVPN to indicate the multicast traffic flow has started for the particular ingress PE device. Other PE devices of the EVPN that receive the SA routes enter into an election to designate one of the multiple PE devices connected to the remote RP device as the device responsible for forwarding multicast traffic into the EVPN, with such designated PE device referred to herein as "multicast forwarder" or "core-facing designated forwarder (core-facing DF)". The other ingress PE devices also connected to the RP device that are not elected as the core-facing DF are configured to not send into the EVPN of the core network the multicast traffic that it receives. In this way, only a single PE device forwards multicast traffic into the EVPN of the core network.

The techniques described also provide failover in the event a core-facing DF fails or otherwise goes down (e.g., via link failure). For example, in response to determining that the core-facing DF is down (e.g., via a liveliness detection protocol such as Bidirectional Forwarding Detection (BFD)), the PE devices that received an SA route from the PE device elected as the original core-facing DF withdraw the SA route received from the PE device elected as the original core-facing DF, and elects a new core-facing DF with the remaining PE devices that received SA routes.

The techniques described in this disclosure may provide one or more technical advantages that realizes a practical application. For example, by advertising a SA route, a single PE device is elected as a multicast forwarder to forward multicast traffic into the EVPN of the core network, which prevents other PE devices from forwarding duplicate multicast traffic into the EVPN of the core network.

In some examples, a method includes determining, by a first provider edge (PE) device of a plurality of PE devices that participate in an Ethernet Virtual Private Network (EVPN), that a first multicast traffic flow has started for the first PE device. The method also includes, in response to determining that the multicast traffic flow has started for the first PE device, sending, by the first PE device, a source-active (SA) route to the plurality of PE devices to indicate the first multicast traffic flow has started for the first PE device. Moreover, the method includes receiving, by the first PE device and from a second PE device of the plurality of PE devices, a second SA route that indicates that a second multicast traffic flow has started for the second PE device. The method further includes performing, by the first PE device, an election of a core-facing designated forwarder from among the first PE device and second PE device, wherein the core-facing designated forwarder is configured to forward the multicast traffic into the EVPN.

In some examples, a system includes a first provider edge (PE) device and a second PE device of a plurality of PE devices that participate in an Ethernet Virtual Private Network (EVPN). The first PE device of the system is configured to: determine that a first multicast traffic flow has started for the first PE device; in response to determining that the first multicast traffic flow has started for the first PE device, send a first source-active (SA) route to the plurality of PE devices to indicate the first multicast traffic flow has started for the first PE device; receive a second SA route that indicates a second multicast traffic flow has started for the second PE device; perform an election of a core-facing designated forwarder from among the first PE device and second PE device, wherein the core-facing designated forwarder is configured to forward the multicast traffic into the EVPN. The second PE device of the system is configured to: determine that the second multicast traffic flow has started for the second PE device; in response to determining that the second multicast traffic flow has started for the second PE device, send the second SA route to the plurality of PE devices to indicate the second multicast traffic flow has started for the second PE device; receive the first SA route that indicates the first multicast traffic flow has started for the first PE device; and perform an election of the core-facing designated forwarder from among the first PE device and second PE device.

In some examples, a network device operable as a first provider edge (PE) device of a plurality of PE devices participating in an Ethernet Virtual Private Network (EVPN), includes one or more processors operably coupled to a memory, wherein the one or more processors are configured to determine that a first multicast traffic flow has started for the first PE device. The one or more processors are also configured to, in response to determining that the multicast traffic flow has started for the first PE device, send a source-active (SA) route to the plurality of PE devices to indicate the first multicast traffic flow has started for the first PE device. The one or more processors are further configured to receive, from a second PE device of the plurality of PE devices, a second SA route that indicates that a second multicast traffic flow has started for the second PE device. Moreover, the one or more processors are configured to perform an election of a core-facing designated forwarder from among the first PE device and second PE device, wherein the core-facing designated forwarder is configured to forward the multicast traffic into the EVPN.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
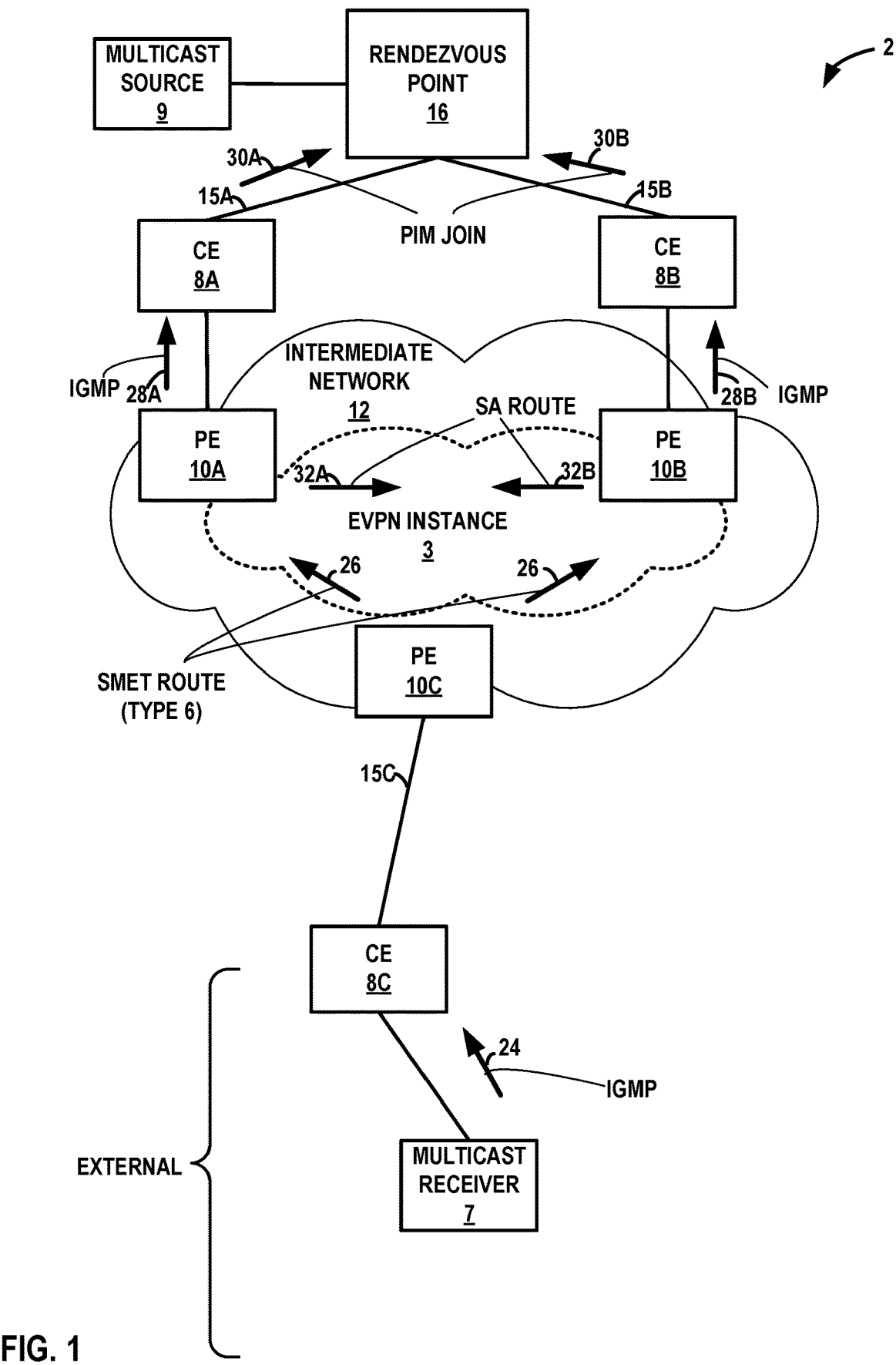
FIG. 1 is a block diagram illustrating an example network system providing core-facing designated forwarder election of an ingress provider edge device to forward multicast traffic into an EVPN of a core network, in accordance with techniques described in this disclosure.

FIG. 1 is a block diagram illustrating an example network system 2 providing core-facing designated forwarder election of an ingress provider edge (PE) device to forward multicast traffic into an EVPN of a core network, in accordance with techniques described in this disclosure. In the example of FIG. 1, PE devices 10A-10C ("PE devices 10" or, more simply, "PEs 10") provide devices with access to an intermediate layer 3 (L3) network (here, "intermediate network 12") via customer edge (CE) devices 8A-8C ("CE devices 8" or, more simply, "CEs 8").

PE devices 10 may each represent a router, switch, aggregation device (AD), or other type of network device capable of performing provider edge operations for an EVPN provided by intermediate network 12. Communication links 15 may be Ethernet, ATM or any other suitable network connections.

CE devices 8 may each represent a host, router, switch, or other suitable network device that participates in an EVPN. CE devices 8 may be edge devices for customer networks, such as geographically or logically separated sites of an enterprise, networks for different customers of the intermediate network 12, or tenants or tenant systems of an intermediate network 12 for a data center. Customer networks may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network system 2 illustrated in FIG. 1 is merely an example. For example, the network system may include any number of customer networks.

In the example of FIG. 1, CE devices 8A and 8B are edge devices for a customer network that includes multicast source 9. Multicast source 9 sources multicast traffic for a multicast group and may represent a real or virtual server. CE device 8C is an edge device for a customer network that includes multicast receiver 7. Multicast receiver 7 joins the multicast group to receive multicast traffic from multicast source 9. CE device 8C is coupled to PE device 10C that provides an EVPN between CE devices 8A-8C.

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Intermediate network 12 may be coupled to one or more networks administered by the provider of intermediate network 12 or other providers, and may thus form part of a large-scale public network infrastructure, e.g., the Internet. In this example, intermediate network 12 is coupled via CE device 8C to an external network or networks that includes a multicast receiver 7 that is an interested receiver for multicast traffic. Thus, while CE devices 8 are described as customer edge devices in that an EVPN instance is defined in RFC 7432 to include CE devices that are connected to PE devices that form the edge of the MPLS infrastructure, CE devices 8 may be, e.g., another type of edge device or gateway router for a data center or other network that includes PE devices and CE devices.

Intermediate network 12 may provide computing devices within customer networks of the PE device 10 with access to the Internet, and may allow the computing devices within the customer networks to communicate with each other. In some cases, intermediate network 12 represents a data center L2/L3 switching fabric (or "data center fabric network") that interconnects CE devices for tenants of the data center, where a tenant may represent an organization or a logical partitioning of resources, data, and/or applications within the data center.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 2 are illustrated as being directly coupled, it should be understood that one or more additional network elements may be included along any of the illustrated links 15 such that the network elements of network system 2 are not directly coupled.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes L2 EVPN service (and may be referred to herein as "EVPN core" or simply "EVPN"). An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and formed a single L2 network. In a way, EVPN enables a form of a transparent LAN connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with customer networks. The EVPN configuration may include an EVPN instance (EVI), which includes of one or more broadcast domains. Generally, an EVI may be associated with a virtual routing and forwarding instance (VRF) (not shown) on a PE device, such as any of PE devices 10A-10C.

An EVPN instance (EVI) 3 is configured within intermediate network 12 to enable computing devices of customer networks of the PE devices 10 to communicate with one another via the EVI as if the computing devices were directly connected via a L2 network or link. In this example, CE device 8C is able to communicate with CE devices 8A and 8B configured to use the EVI 3 as if CE devices 8A-8C were directly connected via an L2 network or link. As described herein, EVI 3 is an EVPN instance spanning PE devices 10A-10C participating in the EVPN. Each of PE devices 10 is configured with EVI 3 and exchanges EVPN routes to implement EVI 3.

An EVPN, such as EVI 3 illustrated in the example of FIG. 1, may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution Protocol (LDP) or the Resource Reservation Protocol with Traffic Engineering extensions (RSVP-TE), a source device can request a path through a network to a destination device, e.g., a Label Switched Path (LSP). An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path.

As shown in the example of FIG. 1, intermediate network 12 may provide an MPLS core or IP tunneling infrastructure for sending network packets from CE devices 8A or 8B to and from CE device 8C, which may include sending the network packets over a mesh of tunnels interconnecting PE devices 10. Intermediate network 12 and EVPN instance 3 may include additional PE devices 10. Each of PE devices 10A-10C implement the MPLS protocol and apply one or more MPLS labels, e.g., a label stack, to network packets in accordance with routing and forwarding information configured at each respective PE device. In an EVPN, a label stack applied to a network packet may include multiple labels. For instance, a label stack may include an outer label and an inner label.

PE devices 10A-10C may communicate, for example, using the Border Gateway Protocol (BGP) to transport BGP Network Layer Reachability Information (NLRI) for the EVPN and may define different EVPN route types for conveying EVPN information via the BGP routing protocol. The EVPN NLRI is typically carried in BGP using BGP Multiprotocol Extensions.

In the example of FIG. 1, when providing the EVPN service to customer networks, PE devices 10 and CE devices 8 perform MAC address learning to efficiently forward L2 network communications in network system 2. That is, as PE devices 10 and CE devices 8 forward Ethernet frames, the routers learn L2 state information for the L2 network, including MAC addressing information for endpoint devices within the network and the physical ports through which the endpoint devices are reachable. PE devices 10 and CE devices 8 typically store the MAC addressing information in MAC tables associated with respective interfaces. When forwarding an individual Ethernet frame received on one interface, a network device typically broadcasts the Ethernet frame to all other interfaces associated with the EVPN unless the router has previously learned the specific interface through which the destination MAC address specified in the Ethernet frame is reachable.

Moreover, as PE devices 10 learn the MAC addresses for devices reachable through local attachment circuits (e.g., CE devices 8), the PE devices 10 use MAC address route advertisements of an L3 routing protocol (e.g., Multi-Protocol BGP (MP-BGP)) to share the learned MAC addresses and to provide an indication that the MAC addresses are reachable through the particular PE device that is issuing the route advertisement. In the EVPN implemented using PE devices 10 for a given EVI, each of PE devices 10 advertises the locally learned MAC addresses to other PE devices 10 using a BGP route advertisement, also referred to herein as a "MAC route," "MAC Advertisement route," or "MAC/IP Advertisement." As further described below, a MAC route typically specifies an individual MAC address of devices along with additional forwarding information, such as a route distinguisher, Ethernet tag identifier, MPLS label, etc. In this way, PE devices 10 use BGP to advertise and share the MAC addresses learned when forwarding layer two communications associated with the EVPN. Accordingly, PE devices 10 may perform both local learning and remote learning of MAC addresses.

Each of PE devices 10 uses MAC routes specifying the MAC addresses learned by other PE devices to determine how to forward L2 communications to MAC addresses that belong to devices connected to other PE devices, i.e., to remote CE devices and/or devices behind CE devices operatively coupled to PE devices. That is, each of PE devices 10 determine whether Ethernet frames can be sent directly to a particular one of the other CE devices, PE devices 10 or whether to treat the Ethernet frames as so called "BUM" traffic (Broadcast, Unidentified unicast or Multicast traffic) that is to be flooded within the EVPN based on the MAC addresses learning information received from the other PE devices 10.

In the example of FIG. 1, multicast source 9 may operate as a source for multicast traffic to be delivered to one or more multicast groups. Multicast traffic is typically designated by a unique combination for a particular multicast group (*, G) or Source-Group combination (S, G). In general, multicast forwarding state for (*, G) or (S, G) entries is the information by which network devices use for forwarding unicast or multicast packets. S is the source address, G is the multicast group address, and * represents any source sending to multicast group G. Network devices may keep track of the multicast forwarding state for the incoming and outgoing interfaces for each group. Multicast forwarding state for an entry stored by a network device may specify an output interface of the network device for multicast traffic matching the entry.

Multicast receivers, e.g., multicast receiver 7, that join the multicast group may receive multicast traffic sourced from multicast source 9. In the example of FIG. 1, multicast receiver 7 is external to the network (or data center) of multicast source 9. To join a multicast group, multicast receiver 7 implements Internet Group Management Protocol (IGMP) by which multicast receiver 7 announces its interest in receiving particular multicast traffic. For example, multicast receiver 7 sends IGMP report 24 (e.g., join or prune messages) to any immediately neighboring multicast routing devices, e.g., CE device 8C, to indicate its interest in receiving multicast traffic from multicast groups on a given virtual Local Area Network (VLAN). CE device 8C forwards IGMP report 24 to PE device 10C, which translates IGMP report 24 to Selective Multicast Ethernet Tag (SMET) routes 26 (EVPN Type 6 route) and sends SMET routes 26 over the intermediate network 12 to PE devices belonging to the EVPN (e.g., PE devices 10A and 10B) to distribute the intent of multicast receiver 7 to receive multicast traffic for a certain multicast group (*, G) or Source-Group combination (S, G). A SMET route may include a route distinguisher, Ethernet tag identifier, multicast source address, multicast group address, originator router address, etc. Additional examples of a SMET route is described in Sajassi, "IGMP and MLD Proxy for EVPN, draft-ietf-bess-evpn-igmp-mld-proxy-04, Internet-Draft, Sep. 30, 2019, the entire contents of which is incorporated by reference herein.

Each of PE devices 10A and 10B receives a respective one of SMET routes 26, translates the SMET route back to an IGMP report, and sends the IGMP report to connected CE devices. For example, in response to receiving SMET route 26 from PE device 10C, PE device 10A translates the SMET route to IGMP report 28A, and sends IGMP report 28A to CE device 8A. Similarly, in response to receiving SMET route 26 from PE device 10C, PE device 10B translates the SMET route to IGMP report 28B, and sends IGMP report 28B to CE device 8B.

In the example of FIG. 1, network system 2 includes Rendezvous Point (RP) device 16. RP device 16 serves as an information exchange point in which multicast traffic from a multicast source and join messages from network devices of interested multicast receivers "rendezvous" at RP device 16. RP device 16 may represent a router, switch, virtual machine running on a router or other suitable network device.

In this example, CE devices 8A, 8B and RP device 16 may use one or more multicast control plane protocols, such as Protocol Independent Multicast (PIM), to exchange multicast information for building and modifying multicast distribution trees and to control delivery of multicast traffic from multicast sources to multicast receivers for particular multicast groups over a layer 3 network, e.g., intermediate network 12. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A. et al., "Protocol Independent Multicast Version 2-Dense Mode Specification," RFC 3973, 2005; Fenner, B., et al., "Protocol Independent Multicast-Sparse Mode (PIM-SM): Protocol Specification (Revised), "RFC 4601, 2006; Holbrook, H. and B. Cain, "Source-Specific Multicast for IP," RFC 4607, 2006; and Handley, M., et al., "Bidirectional Protocol Independent Multicast (BIDIRPIM)," RFC 5015, 2007, the entire contents of each of which are incorporated by reference herein.

As one example, CE devices 8A and 8B receive IGMP reports 28A-28B from PE devices 10A and 10B, respectively, and creates PIM states based on IGMP reports 28. CE devices 8A and 8B then send PIM (*, G) join messages 30A-30B (collectively, "PIM join messages 30"), respectively, to RP device 16. The RP device 16 receives PIM (*, G) join messages 30 and adds the interface on which it was received to the outgoing interface list (OIL) of the rendezvous-point tree (RPT) multicast forwarding state entry for (*, G). In this way, RP device 16 may forward multicast traffic from multicast source 9 for the group, G, to the interested multicast receiver, e.g., multicast receiver 7.

In some examples, such as illustrated in FIG. 1, PE devices 10A and 10B are separately connected to CE devices 8A and 8B, respectively. For example, PE device 10A connects to RP device 16 via CE device 8A. Similarly, PE device 10B connects to RP device 16 via CE device 8B. Having separate connections typically provides resiliency for multicast source 9 to send multicast traffic over intermediate network 12 should one of the PE devices fail. For instance, if PE device 10A fails, PE device 10B forwards multicast traffic over intermediate network 12, and vice-versa.

As described above, RP device 16 receives PIM (*, G) join messages 30 (from the separate connections) and adds the interface on which it was received to the outgoing interface list (OIL) of the rendezvous-point tree (RPT) multicast forwarding state entry for (*, G). If multicast traffic received from multicast source 9 matches a forwarding state entry, RP device 16 sends multicast traffic to each of the interfaces to CE devices 8A and 8B, respectively, which in turn forwards the multicast traffic to PE devices 10A and 10B. Without the techniques described in this disclosure, each of PE devices 10A and 10B may receive the multicast traffic and sends the multicast traffic over intermediate network 12 to PE device 10C. This results in duplicate multicast traffic being sent to multicast receiver 7.

In accordance with techniques described herein, a plurality of ingress PE devices, e.g., PE devices 10A and 10B, may send a Source-Active (SA) route to trigger an election of one of the ingress PE devices as the device responsible for forwarding multicast traffic into the EVPN core, with such designated PE device referred to herein as "multicast forwarder" or "core-facing designated forwarder (core-facing DF)". The other ingress PE devices are configured to not send multicast traffic that it receives into the EVPN core.

For example, each ingress PE device, e.g., PE devices 10A and/or 10B may, in response to determining that a multicast traffic flow has started for the PE device, sends a source-active (SA) route (e.g., SA routes 32A-32B (collectively, "SA routes 32")), to other ingress PE devices of EVI 3 to indicate the multicast traffic flow has started for the PE device. SA routes 32 may represent a SMET route (e.g., Type 6 route) that includes a source-active extended community (referred to herein as "source-active community" or "SA-COM") to indicate the multicast traffic flow has started for the PE device. In another example, SA routes may represent a Per-Region Inclusive P-Multicast Service Interface (I-PMSI) Auto-Discovery (A-D) route (Type 9 route) to indicate the multicast traffic flow has started for the PE device. In other examples, SA routes 32 may represent a dedicated EVPN Source-Active Auto-Discovery (A-D) route (e.g., Type 10 route) to indicate the multicast traffic flow has started for the PE device.

As one example, PE device 10A receives multicast traffic from multicast source 9 and determines that the multicast traffic matches an entry in its multicast forwarding state, and thus the multicast traffic flow has started. In response to determining that the multicast traffic flow has started, PE device 10A sends SA route 32A to PE device 10B to indicate that a multicast traffic flow has started for PE device 10A. Similarly, PE device 10B may receive multicast traffic and determine that the multicast traffic matches an entry in its multicast forwarding state, and thus the multicast traffic flow has started. In response to determining that the multicast traffic flow has started, PE device 10B sends SA route 32B to PE device 10A to indicate that a multicast traffic flow has started for PE device 10B.

In response to receiving SA routes 32, PE devices 10A and 10B elect, from among the PE devices that received SA routes 32, a core-facing DF to forward the multicast traffic for the particular multicast group (*, G) or Source-Group (S, G) combination over intermediate network 12 to PE device 10C. PE devices 10 may elect a network device as the core-facing DF based on IP addresses (e.g., higher IP addresses) or other election mechanisms, similar to the designated forwarder election algorithms described in S. Mohanty, "A new Designated Forwarder Election for the EVPN," draft-ietf,-bess-evpn-df-election-03, Oct. 10, 2017, the entire contents of which is incorporated by reference herein. In one example, PE device 10A is elected as the core-facing DF and is configured to forward the multicast traffic for the particular multicast group (*, G) or Source-Group (S, G) combination over intermediate network 12 to PE device 10C. PE device 10B (and, in other examples, other PE devices that received SA routes) is configured to not forward the multicast traffic (e.g., drop the multicast traffic) for the particular multicast group (*, G) or Source-Group (S, G) combination. In some examples, PE device 10A is core-facing DF for certain flows, while PE device 10B is core-facing DF for other flows. In other examples in which there are multiple multicast sources, an ingress PE device, e.g., PE device 10A, may be elected as a core-facing DF to forward multicast traffic for the particular multicast group (*, G).

In this way, only a single ingress PE device is elected as a multicast forwarder to forward multicast traffic into the EVPN core, which prevents other PE devices from forwarding duplicate multicast traffic into the EVPN core.

In some examples, network system 2 also provides failover in the event a core-facing DF fails or otherwise goes down. For example, PE device 10A, originally elected as a core-facing DF, may be unable to forward multicast traffic due to link or node failure. PE device 10B may determine that the original core-facing DF is down via, for example, a liveliness detection protocol such as Bidirectional Forwarding Detection (BFD). In response to determining that PE device 10A is unable to fill its role as forwarder into the core network 12, PE device 10B (or other PE devices in the EVPN) withdraws the SA route (e.g., SA route 32A) received from PE device 10A, and elects a new core-facing DF. In this example, PE device 10B is elected as a new core-facing DF and assumes the role of forwarding multicast traffic into the EVPN core by updating its forwarding state to forward the multicast traffic.

In some examples, a PE device coupled to a RP device, such as PE device 10A, may actively remove itself from being elected as a core-facing DF based on rate-based characteristics. For example, if its traffic rate meets a particular threshold rate, PE device 10A may withdraw the SA route and therefore remove itself from being elected as a core-facing DF. PE device 10A may utilize other characteristics, such as link latency, cost metrics, CPU/memory utilization, and the like.

Figure 2:
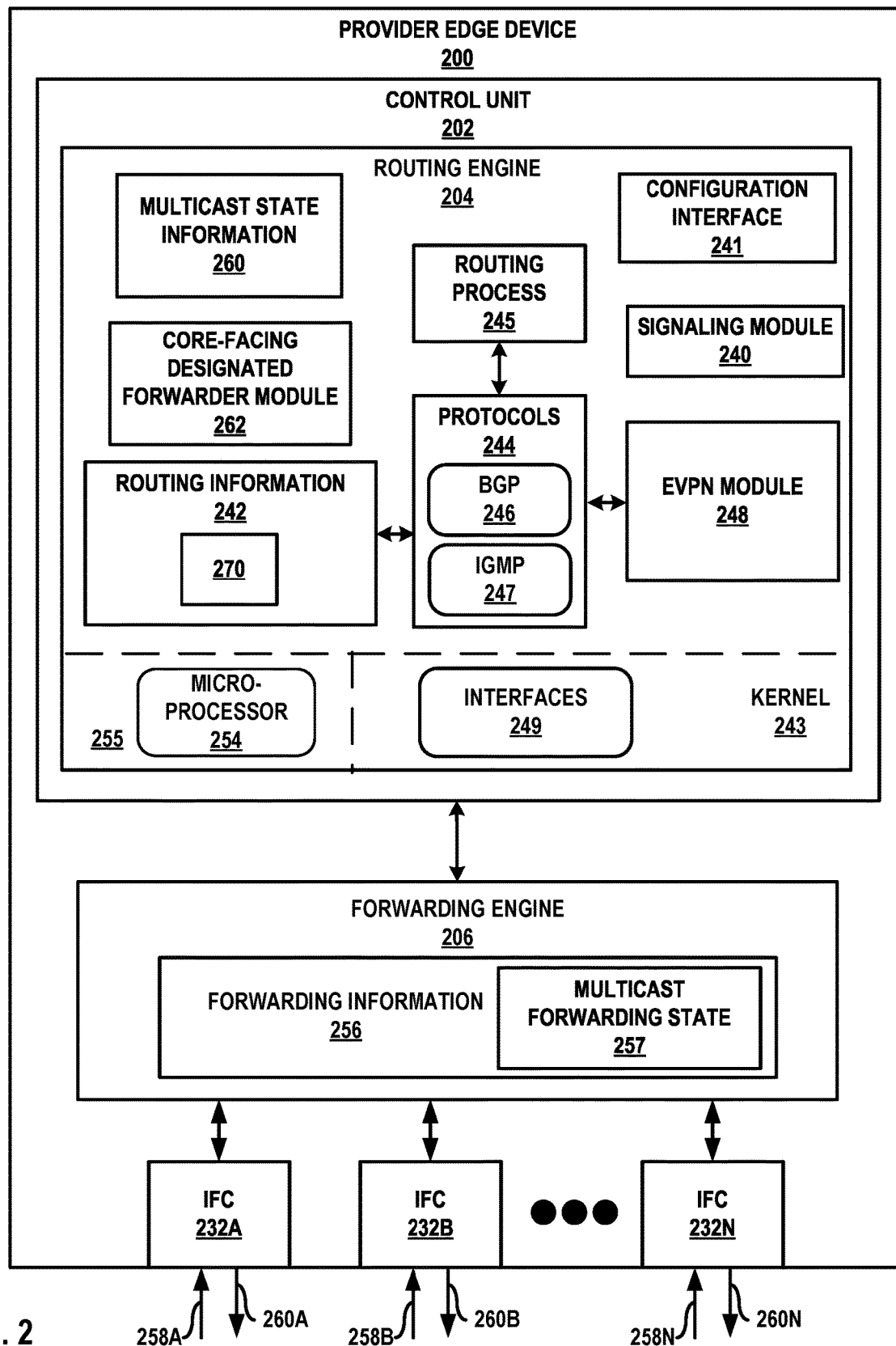
FIG. 2 is a block diagram illustrating an example network device configured to provide core-facing designated forwarder election, in accordance with techniques described in this disclosure.

FIG. 2 is a block diagram illustrating an example of a network device configured to provide core-facing designated forwarder election, in accordance with techniques described in this disclosure.

In one example, PE device 200 may represent an example instance of any of PE devices 10 of FIG. 1. In this example, PE device 200 includes a control unit 202 that includes a routing engine 204, and control unit 202 is coupled to a forwarding engine 206. Forwarding engine 206 is associated with one or more of interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Interfaces for inbound links 258 and outbound links 260 may represent physical interfaces, logical interfaces, or some combination thereof. Interfaces for links 258, 260 may represent local interfaces of PE device 200.

Elements of control unit 202 and forwarding engine 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 200, e.g., protocols. Control unit 202, in some examples, retrieves and executes the instructions from memory for these aspects.

Routing engine 204 includes kernel 243, which provides a run-time operating environment for user-level processes. Kernel 243 may represent, for example, a UNIX operating system derivative such as Linux or Berkeley Software Distribution (BSD). Kernel 243 offers libraries and drivers by which user-level processes may interact with the underlying system. Hardware environment 255 of routing engine 204 includes microprocessor 254 that executes program instructions loaded into a main memory (not shown in FIG. 2) from a storage device (also not shown in FIG. 2) in order to execute the software stack, including both kernel 243 and processes executing on the operating environment provided by kernel 243. Microprocessor 254 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 243 provides an operating environment for a routing process 245 that executes various protocols 244 at different layers of a network stack, including protocols for implementing Ethernet Virtual Private Networks. For example, routing engine 204 includes network protocols that operate at a network layer of the network stack. In the example of FIG. 2, network protocols include the Border Gateway Protocol (BGP) 246. The network protocols may also include Internet Group Management Protocol (IGMP) 247. Routing engine 204 may also include other protocols, such as an MPLS label distribution protocol and/or other MPLS protocols not shown in FIG. 2. Routing engine 204 is responsible for the maintenance of routing information 242 to reflect the current topology of a network and other network entities to which PE device 200 is connected. In particular, routing protocols periodically update routing information 242 to accurately reflect the topology of the network and other entities based on routing protocol messages received by PE device 200. Routing engine 204 further includes a multicast state information 260 that maintains IGMP state data for a plurality of multicast groups to which PE device 200 belongs. Multicast state information 260 may be a table, database or any type of data structure.

Kernel 243 includes an interfaces table 249 ("interfaces 249") that represents a data structure that includes a corresponding entry for each logical interface configured for PE device 200. Logical interfaces may correspond to local interfaces of PE device 200. Entries for respective logical interfaces may specify respective current information describing the logical interfaces.

Routing information 242 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing engine 204 also includes an EVPN module 248 that performs L2 learning using BGP 246. EVPN module 248 may maintain tables for each EVPN instance (EVI) established by PE device 200, or in alternative examples, may maintain one or more tables that are independent of each respective EVI. In some examples, and in accordance with one or more techniques described in this disclosure, PE device 200 may use EVPN module 248 to advertise, e.g., EVPN routes, such as Selective Multicast Ethernet Tag (SMET) (Type 6 route) including an extended community (e.g., Source-Active Community) to other PE devices of the EVPN network to indicate the multicast traffic flow has started for PE device 200. In another example, EVPN module 248 may alternatively, or additionally, send a Per-Region Inclusive P-Multicast Service Interface (I-PMSI) Auto-Discovery (A-D) route (Type 9 route) to indicate the multicast traffic flow has started for PE device 200. In other examples, EVPN module 248 may alternatively, or additionally, send other EVPN routes, such as a Source-Active Ethernet A-D route (Type 10 route) to indicate the multicast traffic flow has started for network device 200.

Signaling module 240 outputs control plane messages to automatically establish tunnels to interconnect multiple network devices including PE device 200 and otherwise provision one or more EVIs configured for PE device 200 and other network devices. Signaling module 240 may signal the network devices using one or more suitable tunnel signaling protocols, such as GRE, VXLAN, and/or MPLS protocols. Signaling module 240 can communicate with forwarding engine 206 to automatically update forwarding information 256. In some examples, signaling module 240 may be part of or executed by routing process 245.

Routing engine 204 also includes a configuration interface 241 that receives and may report configuration data for PE device 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the PE device 200, and other constructs that at least partially define the operations of PE device 200, including the techniques described herein. For example, an administrator may, after powering-up, activating, or otherwise enabling PE device 200 to operate within a network, interact with control unit 202 via configuration interface 241 to configure PE device 200 to determine whether a multicast traffic flow has started, and in response to determining that the multicast traffic flow has started, send a source-active routing message (e.g., SMET route including an extended community, I-PMSI route, or Source-Active Auto-Discovery (A-D) route). Moreover, the administrator may interact with control unit 202 via configuration interface 241 to configure PE device 200 to configure forwarding engine 206 to forward multicast traffic only if PE device 200 receives, e.g., a SMET route including a join community, and to drop multicast traffic if PE device 200 receives a SMET route including a prune community, as described in this disclosure.

Routing process 245 outputs control-plane messages to automatically establish tunnels such as LSPs, and otherwise provision one or more EVPNs between PE device 200 and each of the other PE devices participating in the EVPN. For example, routing process 245 may use EVPN module 248 to generate EVPN routes and send and receive, via BGP 246 sessions with other network devices, the EVPN routes. For example, EVPN module 248 uses BGP 246 to generate a SMET route (Type 6) including a source-active community to indicate the multicast traffic flow has started for PE device 200. Alternatively, or additionally, EVPN module 248 uses BGP 246 to generate a Per-Region Inclusive P-Multicast Service Interface (I-PMSI) Auto-Discovery (A-D) route (Type 9 route) or an EVPN Source-Active Auto-Discovery (A-D) route (Type 10) to indicate the multicast traffic flow has started for PE device 200.

Routing process 245 may store generated EVPN routes and import/store received EVPN routes to a route table storing EVPN routes 270, including SA routes in routing information 242. For example, in response to receiving a SMET route including a source-active community, routing process 245 may store the SMET route including the source-active community in routing information 242, as EVPN route 270. In some examples, routing process 245 may store information in routing information 242 that indicates whether there is another PE device in which the multicast traffic flow has started for that PE device.

Forwarding engine 206 represents hardware and logic functions that provide high-speed forwarding of network traffic. Forwarding engine 206 typically includes a set of one or more forwarding chips programmed with forwarding information 256 that maps network destinations with specific next hops and the corresponding output interface ports. In general, when PE device 200 receives a packet via one of inbound links 258, forwarding engine 206 identifies an associated next hop for the data packet by traversing the programmed forwarding information 256 based on information within the packet. Forwarding engine 206 forwards the packet on one of outbound links 260 mapped to the corresponding next hop.

In the example of FIG. 2, forwarding engine 206 includes forwarding information 256. In accordance with routing information 242, forwarding engine 206 stores forwarding information 256 that maps packet field values to network destinations with specific next hops and corresponding outbound interface ports. For example, routing engine 204 analyzes information stored in routing information 242 and generates forwarding information for forwarding engine 206, stored in forwarding information 256. Forwarding information 256 may also include multicast forwarding state 257 including information that may associate, for example, network destinations for certain multicast groups with specific next hops and corresponding IFCs 232 and physical output ports for output links 260. Forwarding information 256 may be maintained in the form of one or more tables, link lists, radix trees, databases, flat files, or any other data structures.

In some examples, PE device 200 receives a SMET route at one of IFCs 232. The SMET route may be an example instance of SMET route 26 of FIG. 1. IFCs 232 store the SMET route in memory accessible by routing engine 204. Routing process 245 processes the SMET route to add multicast forwarding state for (*, G) or (S, G) for multicast forwarding state 257. The multicast forwarding state 257 may be associated with the EVPN instance and so be applied to EVPN traffic for the EVPN instance, such as multicast traffic for (*, G) or (S, G). Routing process 245 may also translate the SMET route to an IGMP route and send the IGMP route via an interface for an outbound link of outbound links 260 that is connected to a PIM device (e.g., CE device 8A of FIG. 1). The IGMP route may be an example instance of IGMP route 28A of FIG. 1.

According to the techniques described in this disclosure, PE device 200 may include a core-facing designated forwarder election module 262 to determine whether the multicast traffic flow has started, and if so, determines whether PE device 200 may be a core-facing DF to forward multicast traffic into the EVPN core for a specific multicast group.

In some examples, the core-facing designated forwarder election module 262 may determine from multicast traffic statistics maintained by the forwarding engine 206 whether the multicast traffic flow has started. As one example, PE device 200 receives multicast traffic via one of inbound links 258 and determines whether the multicast traffic matches a multicast forwarding state 257 in forwarding information 256. If the multicast traffic matches the multicast forwarding state 257, forwarding engine 256 may log the match.

In some examples, forwarding engine 206 may, in response to determining that multicast traffic matches multicast forwarding state 257, inform core-facing designated forwarder election module 262 that the multicast traffic flow has started. In some examples, core-facing designated forwarder election module 262 may periodically or intermittently determine from the multicast traffic statistics whether the multicast traffic flow has started.

In response to determining that the multicast traffic flow has started, core-facing designated forwarder election module 262 triggers routing process 245 to send an SA route to other PE devices of the EVPN. For example, routing process 245 may use EVPN module 248 to generate an SA route (e.g., Type 6, Type 9, and/or Type 10) to indicate to other PE devices of the EVPN that the multicast traffic flow for a particular multicast group (*, G) or Source-Group (S, G) combination has started for PE device 200.

PE device 200 may receive SA routes from other PE devices of the EVPN that indicate the PE devices in which the multicast traffic flow for the particular multicast group (*, G), or Source-Group (S, G) combination has also started. The SA routes are stored in EVPN routes 270. In some examples, the SA routes are stored in multicast state information 260.

Core-facing designated forwarder election module 262 may perform an election among the PE devices of the EVPN that received an SA route to be configured as the core-facing DF. For example, core-facing designated forwarder election module 262 may run an election mechanism, such as electing a network device based on IP address, or other election mechanisms.

If PE device 200 is elected as the core-facing DF, core-facing designated forwarder election module 262 configures forwarding engine 206 to forward multicast traffic into the EVPN core. For example, core-facing designated forwarder election module 262 configures an interface for an outbound link of outbound links 260 connected to the EVPN core to forward multicast traffic that matches the multicast forwarding state 257 in forwarding information 256.

If PE device 200 is not elected as the core-facing DF, core-facing designated forwarder election module 262 configures forwarding engine 206 to not forward multicast traffic into the EVPN core. For example, core-facing designated forwarder election module 262 configures an interface for an outbound link of outbound links 260 connected to the EVPN core to not forward (e.g., drop) multicast traffic that matches the multicast forwarding state 257 in forwarding information 256.

In some examples, core-facing designated forwarder election module 262 also provides failover in the event a core-facing DF fails or otherwise goes down (e.g., via link or node failure). For example, PE device 200, originally designated as a non-core-facing DF, may determine that the original core-facing DF is down. PE device 200 may determine that the original core-facing DF is down via, for example, a liveliness detection protocol such as Bidirectional Forwarding Detection (BFD). In response to determining that the original core-facing DF is unable to fill its role as forwarder into the core network, PE device 200 (and other PE devices in the EVPN) withdraws the SA route (e.g., stored in EVPN routes 270 or multicast state information 260) received from the original core-facing DF, and elects a new core-facing DF that assumes the role of forwarding multicast traffic into the EVPN core.

In one example, if PE device 200 is elected as a new core-facing DF, core-facing designated forwarder election module 262 configures forwarding engine 206 to forward multicast traffic into the EVPN core. In another example, if PE device 200 is not elected as a new core-facing DF, core-facing designated forwarder election module 262 configures forwarding engine to not forward multicast traffic into the EVPN core.

Figure 3:
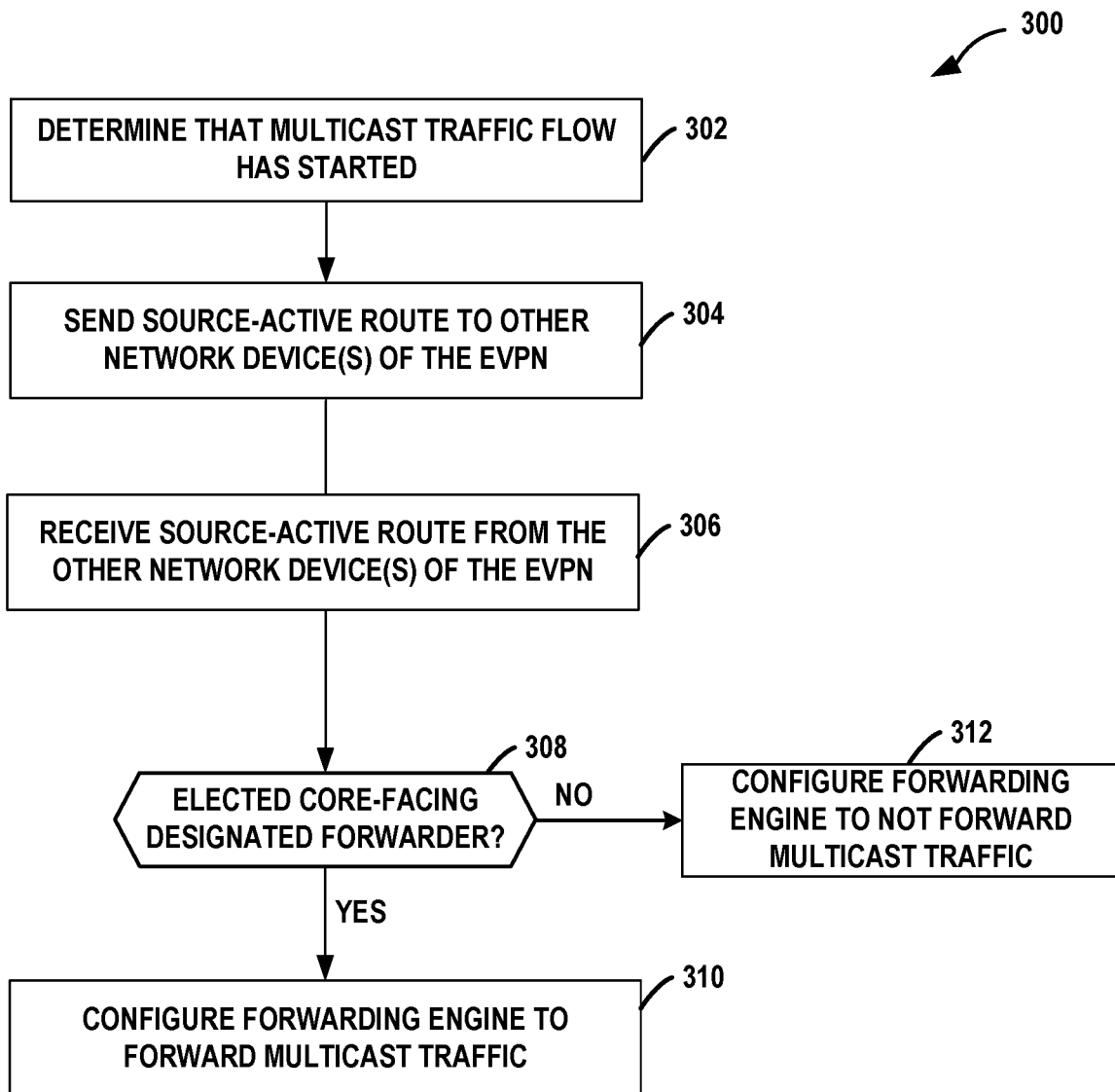
FIG. 3 is a flowchart illustrating an example operation of provider edge devices providing core-facing designated forwarder election, in accordance with techniques described in this disclosure.

FIG. 3 is a flowchart illustrating an example operation of provider edge devices providing core-facing designated forwarder election, in accordance with the techniques described in this disclosure. Operation 300 is described with respect to PE device 200 of FIG. 2 deployed as PE device 10A of FIG. 1 but may be performed by any ingress PE device of the EVPN.

In the example of FIG. 3, PE device 10A determines that the multicast traffic flow has started (302). For example, core-facing designated forwarder election module 262 may determine (periodically or intermittently) from multicast traffic statistics maintained in forwarding engine 206 whether incoming multicast traffic has matched multicast forwarding state 257.

In response to determining that the multicast traffic flow has started, PE device 10A sends an SA route to one or more other PE devices of the EVPN, e.g., PE device 10B, to indicate the multicast traffic flow for PE device 10A has started (304). For example, if there is at least one packet matching the multicast forwarding state 257, the core-facing designated forwarder election module 262 of PE device 10A may instruct EVPN module 248 to advertise, e.g., EVPN routes, such as a SMET route (Type 6 route) including an extended community (e.g., Source-Active Community), an I-PMSI A-D route (Type 9 route), or a Source-Active Ethernet A-D route (Type 10 route) to other PE devices of the EVPN to indicate the multicast traffic flow for PE device 10A has started.

PE device 10A may also receive an SA route from the one or more other PE devices of the EVPN, e.g., PE device 10B (306). For example, PE device 10B also determines that the multicast traffic flow has started and, in response, sends an SA route to one or more of the other PE devices of the EVPN, e.g., PE device 10A, to indicate the multicast traffic flow for PE device 10B has started.

The PE devices that received the SA routes, e.g., PE devices 10A and 10B, then perform an election to designate a PE device among the PE devices that received the SA routes as a core-facing designated forwarder to forward multicast traffic to the EVPN core (308). For example, PE devices 10A and 10B may use an election mechanism (e.g., higher IP address) to elect the core-facing designated forwarder. If PE device 10A is elected as the core-facing designated forwarder ("YES" of step 308), the forwarding engine of PE device 10A is configured to forward multicast traffic for a particular multicast group (*, G) or Source-Group (S, G) combination (310). In this way, when PE device 10A receives multicast traffic from multicast source 9 via RP device 16, PE device 10A forwards the multicast traffic into the EVPN core.

If PE device 10A is not elected as the core-facing designated forwarder ("NO" of step 308), the forwarding engine of PE device 10A is configured to not forward (e.g., drop) multicast traffic for the particular multicast group (*, G) or Source-Group (S, G) combination (312). In this way, when PE device 10A receives multicast traffic from multicast source 9 via RP device 16, PE device 10A does not forward the multicast traffic into the EVPN core.

Figure 4:
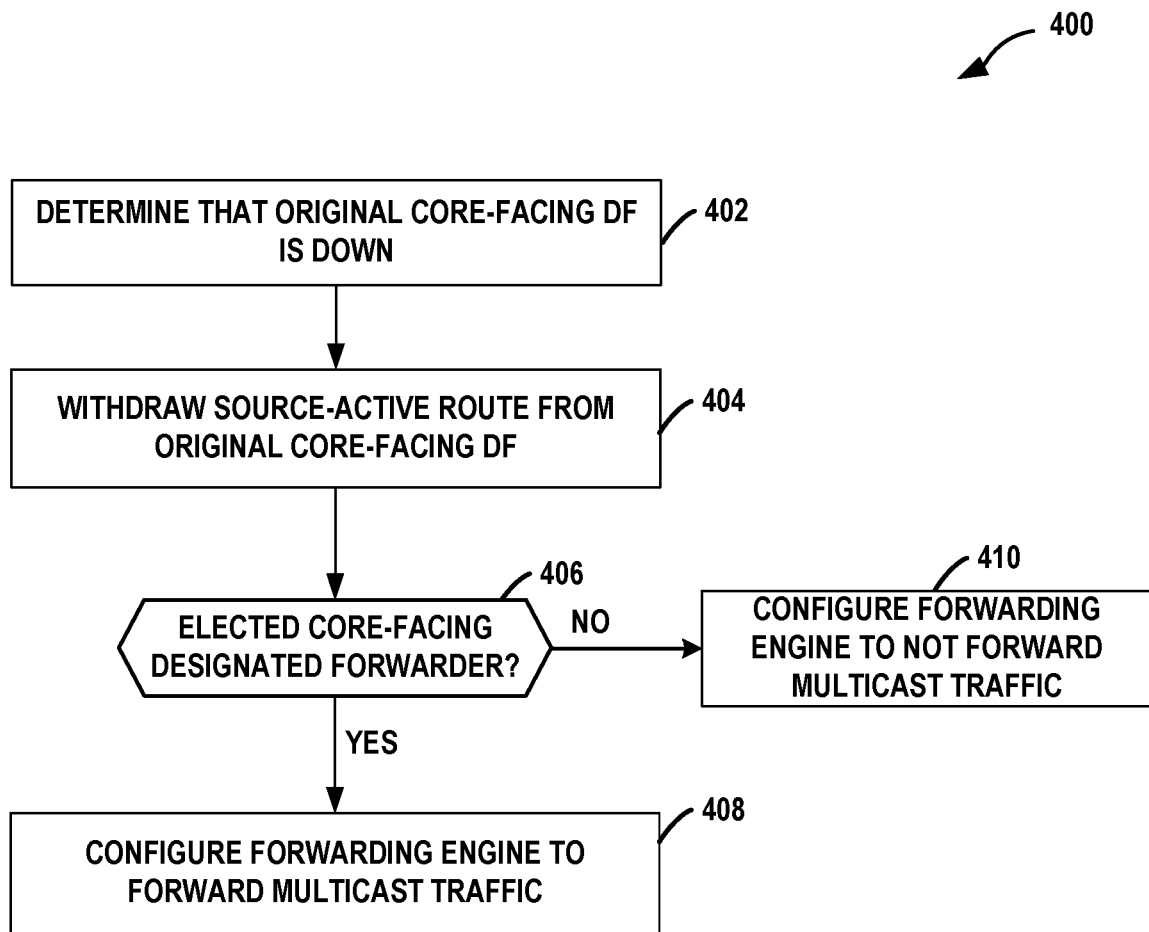
FIG. 4 is a flowchart illustrating an example operation of provider edge devices providing failover for core-facing designated forwarder election, in accordance with techniques described in this disclosure.

FIG. 4 is a flowchart illustrating an example mode of operation of provider edge devices providing failover for core-facing designated forwarder election, in accordance with techniques described in this disclosure. Operation 400 is described with respect to PE device 200 of FIG. 2 deployed as PE device 10B of FIG. 1 but may be performed by any ingress PE device of the EVPN that is not originally elected as the core-facing DF.

In this example, PE device 10A, originally elected as a core-facing DF, may go down via link failure. PE device 10B may determine that the original core-facing DF is down (402). For example, PE device 10B may use Bidirectional Forwarding Detection (BFD) to determine whether PE device 10A is down. In response to determining that PE device 10A is down, PE device 10B withdraws the SA route (e.g., SA route 32A) received from PE device 10A (404), and elects a new core-facing DF among the PE devices that received the SA routes (406). As described above, PE device 10B may use an election mechanism (e.g., higher IP address) to elect the core-facing designated forwarder (or in this case assume the role of core-facing DF if there are no other PE devices that received the SA routes). If PE device 10B is elected as the core-facing designated forwarder ("YES" of step 406), the forwarding engine of PE device 10B is configured to forward multicast traffic for a particular multicast group (*, G) or Source-Group (S, G) combination (408). In this way, when PE device 10B receives multicast traffic from multicast source 9 via RP device 16, PE device 10B acts as the new core-facing DF and forwards the multicast traffic into the EVPN core.

If PE device 10B is not elected as the core-facing designated forwarder ("NO" of step 410), such as another ingress PE device that received the SA routes, the forwarding engine of PE device 10B is configured to not forward (e.g., drop)

multicast traffic for the particular multicast group (*, G) or Source-Group (S, G) combination (410). In this way, when PE device 10B receives multicast traffic from multicast source 9 via RP device 16, PE device 10B does not forward the multicast traffic into the EVPN core.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method comprising:
   determining, by a first provider edge (PE) device of a plurality of PE devices that participate in an Ethernet Virtual Private Network (EVPN), that the first PE device has received multicast traffic from a multicast source;
   in response to determining that the first PE device has received multicast traffic from the multicast source, advertising, by the first PE device, a first source-active (SA) route that indicates the first PE device has received multicast traffic from the multicast source;
   receiving, by the first PE device, a second SA route advertised by a second PE device of the plurality of PE devices, wherein the second SA route indicates a the second PE device has received multicast traffic from the multicast source; and
   performing, by the first PE device and in response to advertising the first SA route and receiving the second SA route advertised by the second PE device, an election with the second PE device to elect from among the first PE device and second PE device a core-facing designated forwarder that is to be configured to forward multicast traffic into the EVPN.

2. The method of claim 1, further comprising:
   in response to electing the first PE device as the core-facing designated forwarder, configuring, by the first PE device, a forwarding engine of the first PE device to forward the multicast traffic into the EVPN.

3. The method of claim 1, further comprising:
   in response to electing the second PE device as the core-facing designated forwarder, configuring, by the first PE device, a forwarding engine of the first PE device to not forward the multicast traffic into the EVPN.

4. The method of claim 1, wherein determining that the first PE device has received multicast traffic from the multicast source is based on multicast traffic statistics maintained by a forwarding engine of the first PE device,
   wherein the multicast traffic statistics indicates at least one instance of the multicast traffic matching a multicast forwarding state of the forwarding engine of the first PE device.

5. The method of claim 1, wherein the first PE device is elected as the core-facing designated forwarder, the method further comprising:
   determining, by the first PE device, that a traffic rate of the first PE device falls below a threshold; and
   in response to determining that the traffic rate of the first PE device falls below the threshold, withdrawing, by the first PE device, the first SA route.

6. The method of claim 1, wherein the second PE device is elected as the core-facing designated forwarder, the method further comprising:
   determining, by the first PE device, that the second PE device is down;
   in response to determining that the second PE device is down, withdrawing, by the first PE device, the second SA route;
   in response to withdrawing the second SA route, performing, by the first PE device, an election with other PE devices from which the first PE device received SA routes to elect from among the first PE device and other PE devices from which the first PE device received SA routes a new core-facing designated forwarder that is to be configured to forward multicast traffic into the EVPN.

7. A system comprising:
   a first provider edge (PE) device and a second PE device of a plurality of PE devices that participate in an Ethernet Virtual Private Network (EVPN),
   wherein the first PE device comprises one or more processors coupled to a memory, wherein the one or more processors are configured to:
      determine that a the first PE device has received multicast traffic from a multicast source;

in response to determining that the first PE device has received multicast traffic from a multicast source, advertise a first source-active (SA) route that indicates the first PE device has received multicast traffic from the multicast source;

receive a second SA route advertised by the second PE device, wherein the second SA route indicates the second PE device has received multicast traffic from the multicast source;

perform, in response to advertising the first SA route and receiving the second SA route advertised by the second EP device, an election with the second PE device to elect from among the first PE device and second PE device a core-facing designated forwarder that is to be configured to forward multicast traffic into the EVPN; and wherein the second PE device comprises one or more processors coupled to a memory, wherein the one or more processors are configured to:

determine that the second PE device has received multicast traffic from the multicast source;

in response to determining that the second PE device has received multicast traffic from the multicast source, advertise the second SA route that indicates the second PE device has received multicast traffic from the multicast source;

receive the first SA route; and perform, in response to advertising the second SA route and receiving the first SA route advertised by the first PE device, an election with the first PE device to elect from among the first PE device and second PE device the core-facing designated forwarder.

8. The system of claim 7,
wherein the first PE device is further configured to, in response to electing the first PE device as the core-facing designated forwarder, configure a forwarding engine of the first PE device to forward the multicast traffic into the EVPN, and
wherein the second PE device is further configured to, in response to electing the first PE device as the core-facing designated forwarder, configure a forwarding engine of the second PE device to not forward the multicast traffic into the EVPN.

9. The system of claim 7,
wherein, to determine that the first PE device has received multicast traffic from the multicast source, the first PE device is configured to determine the first PE device has received multicast traffic from the multicast source based on first multicast traffic statistics maintained by a forwarding engine of the first PE device,
wherein the first multicast traffic statistics indicates at least one instance of the multicast traffic matching a multicast forwarding state of the forwarding engine of the first PE device,
wherein, to determine that the second PE device has received multicast traffic from the multicast source, the second PE device is configured to determine the second PE device has received multicast traffic from the multicast source based on second multicast traffic statistics maintained by a forwarding engine of the second PE device, and
wherein the second multicast traffic statistics indicates at least one instance of the multicast traffic matching a multicast forwarding state of the forwarding engine of the second PE device.

10. The system of claim 7, wherein the first PE device is elected as the core-facing designated forwarder, the first PE device is further configured to:
determine that a traffic rate of the first PE device falls below a threshold; and
in response to determining that the traffic rate of the first PE device falls below the threshold, withdraw the first SA route.

11. The system of claim 7, wherein the second PE device is elected as the core-facing designated forwarder, the first PE device is further configured to:
determine that the second PE device is down;
in response to determining that the second PE device is down, withdraw the second SA route;
in response to withdrawing the second SA route, perform an election with other PE devices from which the first PE device received SA routes to elect from among the first PE device and other PE devices from which the first PE device received SA routes a new core-facing designated forwarder that is to be configured to forward multicast traffic into the EVPN.

12. A network device operable as a first provider edge (PE) device of a plurality of PE devices participating in an Ethernet Virtual Private Network (EVPN), comprising:
one or more processors operably coupled to a memory, wherein the one or more processors are configured to:
determine that the first PE device has received multicast traffic from a multicast source;
in response to determining that first PE device has received multicast traffic from the multicast source, advertise a first source-active (SA) route that indicates the first PE device has received multicast traffic from the multicast source;
receive, from a second PE device of the plurality of PE devices, a second SA route that indicates that the second PE device has received multicast traffic from the multicast source; and
perform, in response to advertising the first SA route and receiving the second SA route advertised by the second PE device, an election with the second PE device to elect from among the first PE device and second PE device a core-facing designated forwarder that is to be configured to forward multicast traffic into the EVPN.

13. The network device of claim 12, wherein the one or more processors are further configured to:
in response to electing the first PE device as the core-facing designated forwarder, configure a forwarding engine of the first PE device to forward the multicast traffic into the EVPN.

14. The network device of claim 13, wherein the one or more processors are further configured to:
in response to electing the second PE device as the core-facing designated forwarder, configure a forwarding engine of the first PE device to not forward the multicast traffic into the EVPN.

15. The network device of claim 13, wherein, to determine that the first PE device has received multicast traffic from the multicast source, the one or more processors are configured to:
determine the first PE device has received multicast traffic from the multicast source based on multicast traffic statistics maintained by a forwarding engine of the first PE device,
wherein the multicast traffic statistics indicates at least one instance of the multicast traffic matching a multicast forwarding state of the forwarding engine of the first PE device.

16. The network device of claim 13, wherein the first PE device is elected as the core-facing designated forwarder, the one or more processors are further configured to:
- determine that a traffic rate of the first PE device falls below a threshold; and
- in response to determining that the traffic rate of the first PE device falls below the threshold, withdraw the first SA route.

17. The network device of claim 12, wherein the second PE device is elected as the core-facing designated forwarder, the one or more processors are further configured to:
- determine that the second PE device is down;
- in response to determining that the second PE device is down, withdraw the second SA route;
- in response to withdrawing the second SA route, perform an election with other PE devices from which the first PE device received SA routes to elect from among the first PE device and other PE devices from which the first PE device received SA routes a new core-facing designated forwarder that is to be configured to forward multicast traffic into the EVPN.

* * * * *